US010579645B2

United States Patent
Scherpa et al.

(10) Patent No.: US 10,579,645 B2
(45) Date of Patent: Mar. 3, 2020

(54) ARRANGING AND DISPLAYING CONTENT FROM A SOCIAL MEDIA FEED BASED ON RELATIONAL METADATA

(71) Applicant: INTERNATIONAL BUSINESS MACHINES CORPORATION, Armonk, NY (US)

(72) Inventors: Josef Scherpa, Fort Collins, CO (US); Jaime R. Van Wart, Glendale, CA (US)

(73) Assignee: International Business Machines Corporation, Armonk, NY (US)

( * ) Notice: Subject to any disclaimer, the term of this patent is extended or adjusted under 35 U.S.C. 154(b) by 865 days.

(21) Appl. No.: 14/664,087

(22) Filed: Mar. 20, 2015

(65) Prior Publication Data
US 2016/0275167 A1 Sep. 22, 2016

(51) Int. Cl.
| | | |
|---|---|---|
| *G06F 17/30* | (2006.01) | |
| *G06F 3/0484* | (2013.01) | |
| *G06F 3/0482* | (2013.01) | |
| *H04L 12/58* | (2006.01) | |
| *G06F 3/0481* | (2013.01) | |
| *G06F 16/28* | (2019.01) | |
| *G06F 16/951* | (2019.01) | |

(52) U.S. Cl.
CPC ........ *G06F 16/284* (2019.01); *G06F 3/04817* (2013.01); *G06F 16/951* (2019.01); *H04L 51/32* (2013.01)

(58) Field of Classification Search
CPC ......... G06F 17/30595; G06F 17/30864; G06F 3/04817; G06F 3/0482; G06F 3/04842; H04L 51/32

USPC .......................................................... 715/745
See application file for complete search history.

(56) References Cited

U.S. PATENT DOCUMENTS

| | | |
|---|---|---|
| 8,326,880 B2 | 12/2012 | Carson, Jr. et al. |
| 8,463,795 B2 | 6/2013 | van Hoff |
| 8,874,559 B1 * | 10/2014 | Karimzadehgan .......... G06F 17/30516 707/707 |
| 8,996,648 B2 | 3/2015 | Archambault et al. |
| 2008/0215607 A1 * | 9/2008 | Kaushansky .......... G06Q 30/02 |

(Continued)

OTHER PUBLICATIONS

Anonymous, "Method of Categorizing and Presenting Aggregated Posts from a Plurality of Social Networking Sites", IP.com, IPCOM000227973D, May 30, 2013, pp. 1-4.

(Continued)

*Primary Examiner* — Tadesse Hailu
*Assistant Examiner* — Darrin Hope
(74) *Attorney, Agent, or Firm* — Law Office of Jim Boice

(57) ABSTRACT

A method, computer program product, and/or computer system structures and displays social media feeds from a social media service. A social media feed is received. The social media feed is composed of content postings from multiple sources, where each content posting has metadata that is an attribute of one or more content postings. Multiple icons are generated and displayed on a user interface. Each of the multiple icons graphically represents one of the metadata that is an attribute of one or more content posting. An input, which is received from a user of the user interface, indicates a selection of one of the icons, thus causing the display, on the user interface, of at least one content posting that is associated with the selected icon.

14 Claims, 5 Drawing Sheets

(56) References Cited

U.S. PATENT DOCUMENTS

| | | | |
|---|---|---|---|
| 2009/0070683 A1* | 3/2009 | Ward | G06Q 30/02 |
| | | | 715/738 |
| 2010/0205541 A1* | 8/2010 | Rapaport | G06Q 10/10 |
| | | | 715/753 |
| 2010/0223581 A1* | 9/2010 | Manolescu | G06Q 10/00 |
| | | | 715/853 |
| 2011/0153646 A1* | 6/2011 | Hong | G06F 17/3089 |
| | | | 707/769 |
| 2011/0173570 A1 | 7/2011 | Moromisato et al. | |
| 2011/0214086 A1 | 9/2011 | Narayanan et al. | |
| 2012/0072428 A1 | 3/2012 | Kao et al. | |
| 2012/0083675 A1* | 4/2012 | el Kaliouby | A61B 5/165 |
| | | | 600/301 |
| 2012/0084731 A1* | 4/2012 | Filman | G06F 17/3028 |
| | | | 715/838 |
| 2013/0060859 A1 | 3/2013 | Olsen et al. | |
| 2013/0088484 A1 | 4/2013 | Marra et al. | |
| 2013/0166639 A1 | 6/2013 | Shaffer et al. | |
| 2013/0205215 A1 | 8/2013 | Dunn et al. | |
| 2013/0262575 A1 | 10/2013 | Xiong et al. | |
| 2013/0297619 A1* | 11/2013 | Chandrasekaran | G06Q 10/10 |
| | | | 707/748 |
| 2015/0128014 A1* | 5/2015 | Monroe | G06F 3/0482 |
| | | | 715/202 |
| 2016/0099982 A1* | 4/2016 | Driediger | G06F 17/30867 |
| | | | 709/204 |

OTHER PUBLICATIONS

A. Marcus et al., "TwitInfo: Aggregating and Visualizing Microblogs Forevent Exploration", ACM, CHI 2011, Vancouver, BC, Canada, pp. 1-10.

J. Lafferty "Facebook Tests Suggested Groups Module on Mobile", Adweek Blog Network, Social Time, Adweek.com, Sep. 19, 2013, pp. 1-2.

* cited by examiner

ARRANGING AND DISPLAYING CONTENT FROM A SOCIAL MEDIA FEED BASED ON RELATIONAL METADATA

BACKGROUND

The present disclosure relates to the field of electronic devices, and specifically to the use of electronic devices that are capable of displaying content created by multiple users. Still more particularly, the present disclosure relates to electronic devices that organize and display content from multiple users according to user relevance.

SUMMARY

A method, computer program product, and/or computer system structures and displays social media feeds from a social media service. A social media feed is received. The social media feed is composed of content postings from multiple sources, where each content posting has metadata that is an attribute of one or more content postings. Multiple icons are generated and displayed on a user interface. Each of the multiple icons graphically represents one of the metadata that is an attribute of one or more content posting. An input, which is received from a user of the user interface, indicates a selection of one of the icons, thus causing the display, on the user interface, of at least one content posting that is associated with the selected icon.

DETAILED DESCRIPTION

Figure 1:
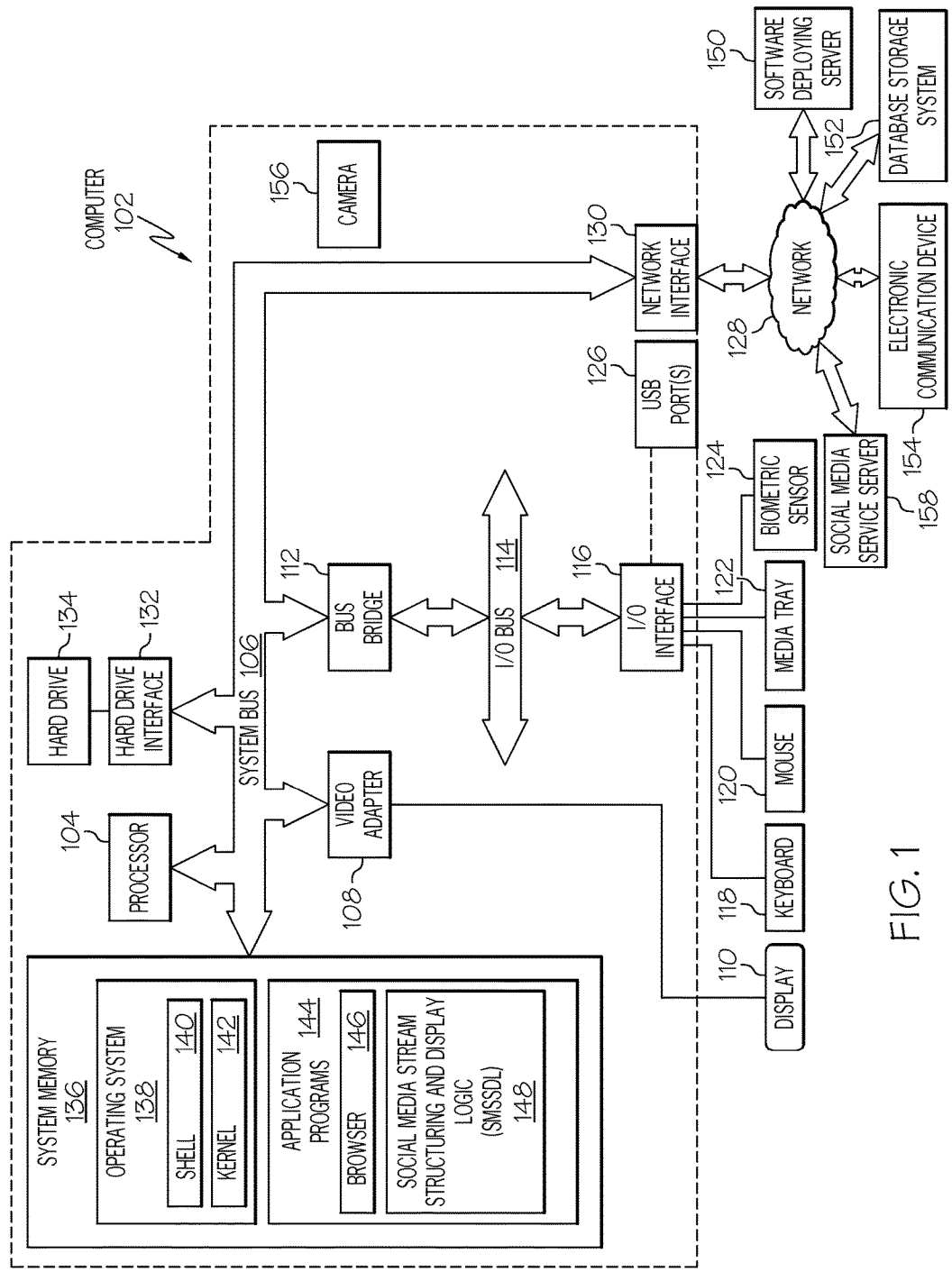
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 102 may be utilized by software deploying server 150 and/or data storage system 152 and/or electronic communication device 154 and/or social media service server 158 shown in FIG. 1.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, electronic communication device 154, social media service center 158, and/or database storage system 152 using a network interface 130. Network interface 130 is a hardware network interface, such as a network interface card (NIC), etc. Network 128 may be an external network such as the Internet, or an internal network such as an Ethernet or a virtual private network (VPN). In one or more embodiments, network 128 is a wireless network, such as a Wi-Fi network.

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a social media stream structuring and display logic (SMSSDL) 148. SMSSDL 148 includes code for implementing the processes described below, including those described in FIGS. 2-5. In one embodiment, computer 102 is able to download SMSSDL 148 from software deploying server 150, including in an on-demand basis, wherein the code in SMSSDL 148 is not downloaded until needed for execution. In one embodiment of the present invention, software deploying server 150 performs all of the functions associated with the present invention (including execution of SMSSDL 148), thus freeing computer 102 from having to use its own internal computing resources to execute SMSSDL 148.

Also within computer 102 is a camera 156, which is capable of capturing still photos or moving video, preferably in a digital format such as a joint photographic experts group (JPEG) format or a moving picture experts group (MPEP) format.

Also within computer 102 is at least one biometric sensor 160. Examples of biometric sensor 160 include, but are not limited to, a blood pressure/pulse monitor (e.g., a pressure/sound sensor that detects the pulse and/or blood pressure of the holder of an electronic device such as a smart phone), a skin sensor (e.g., a resistance sensor that measures a galvanic skin response from the user/holder sweating while holding an electronic device such as a smart phone), pupil dilation detector (e.g., used with camera 156 to capture an image of the user/holder's eye pupils to indicate various emotions that are known to be associated with pupil dilation and/or pupil contraction), a microphone (e.g., to detect a breathing pattern of the holder of an electronic device such as a smart phone), etc. Thus, biometric sensor 160 is an electronic device for gathering biometric data associated with a human. Biometric data is data describing a physiological state, physical attribute, or measurement of a physiological condition of a person.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

A social media feed is a listing of content postings from multiple sources. For example, a social media service may enable a social media webpage, which is dedicated to a particular party to the social media service, to display postings (i.e., content generated by one or more parties) from multiple parties. Such postings may be random, or they may be devoted to a particular topic, group of users, time frame, etc.

Such postings/data are often presented in the form of lists, where list entries contain objects having many attributes. One such example is a social news feed, where each entry in the list consists of multiple rows of information pertaining to an object, event, person, task, etc. For example, an entry in the news feed may describe an update that an editor made to the file, followed by the filename, file author, data of the edit, photo or icon representing the file, comment or "like" (indicating that the reader approves of the content/entry/data) counts from other members of the social network, etc.

Lists of content such as these take up a lot of space on a user interface, making it tedious to consume updates of interest. These social news feeds often list content chronologically, making it difficult to quickly consume all the updates by one central subject matter object (i.e. a person, topic, file, etc.). A viewer would need to read each entry of the entire list to determine which people or content items had recent updates, and all of the updates related to a particular item would be spread out in different places across the stream and interspersed with unrelated entries. Alternately, to see all the updates for one particular person, a user would need to navigate to a profile view for that user, and repeat this process for other people whose updates they are interested in, even though those people might not have any recent updates.

Thus, the present invention presents an interface that allow users to more quickly consume important updates by easily understanding which content subjects have updates, through a user interface in which an icon or image is displayed representing a specific content subject, such as a particular person, file, or other type. The icon then provides summary information on hover of the list items rolled up as represented by the icon.

Figure 2:
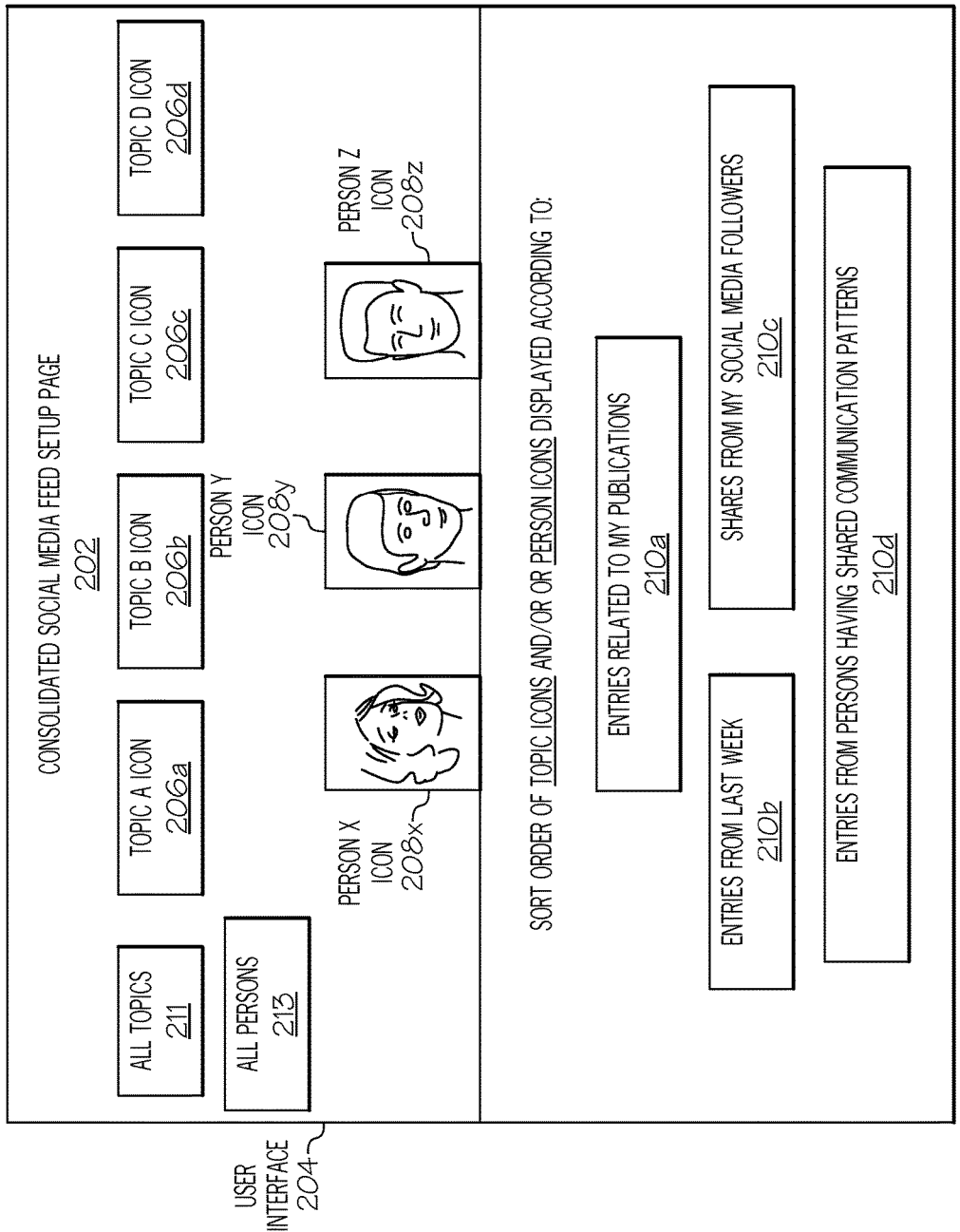
FIG. 2 illustrates an exemplary consolidated social media feed setup page in accordance with one or more embodiments of the present invention.

With reference now to FIG. 2, an exemplary consolidated social media feed setup page 202 on a user interface 204 of a user's electronic device (e.g., computer 102 shown in FIG. 1) in accordance with one or more embodiments of the present invention is presented.

As described herein, an original/initial social media feed may be generated by a user of computer 102 shown in FIG. 1, as well as authors using other electronic devices, such as the electronic communication device 154 via a social media service provided by the social media service server 158 shown in FIG. 1. Although not so depicted in FIG. 2, this original/initial social media feed may initially be displayed on the consolidated social media feed setup page 202.

As shown in consolidated social media feed setup page 202, a user is presented with multiple icons, each of which are clickable to cause a feature of a social media feed display to be dynamically and selectively structured according to the desires of the user. Primary icons used for this purpose are topic icons 206a-206d (where "d" is an integer) and person icons 208x-208z (where "z" is an integer).

Topic icons 206a-206d represent different topics of social media postings on a particular social media page that is displayed to a user. Additional details of such a social media page after being configured according to embodiments of the present invention are depicted in FIG. 3.

Figure 4:
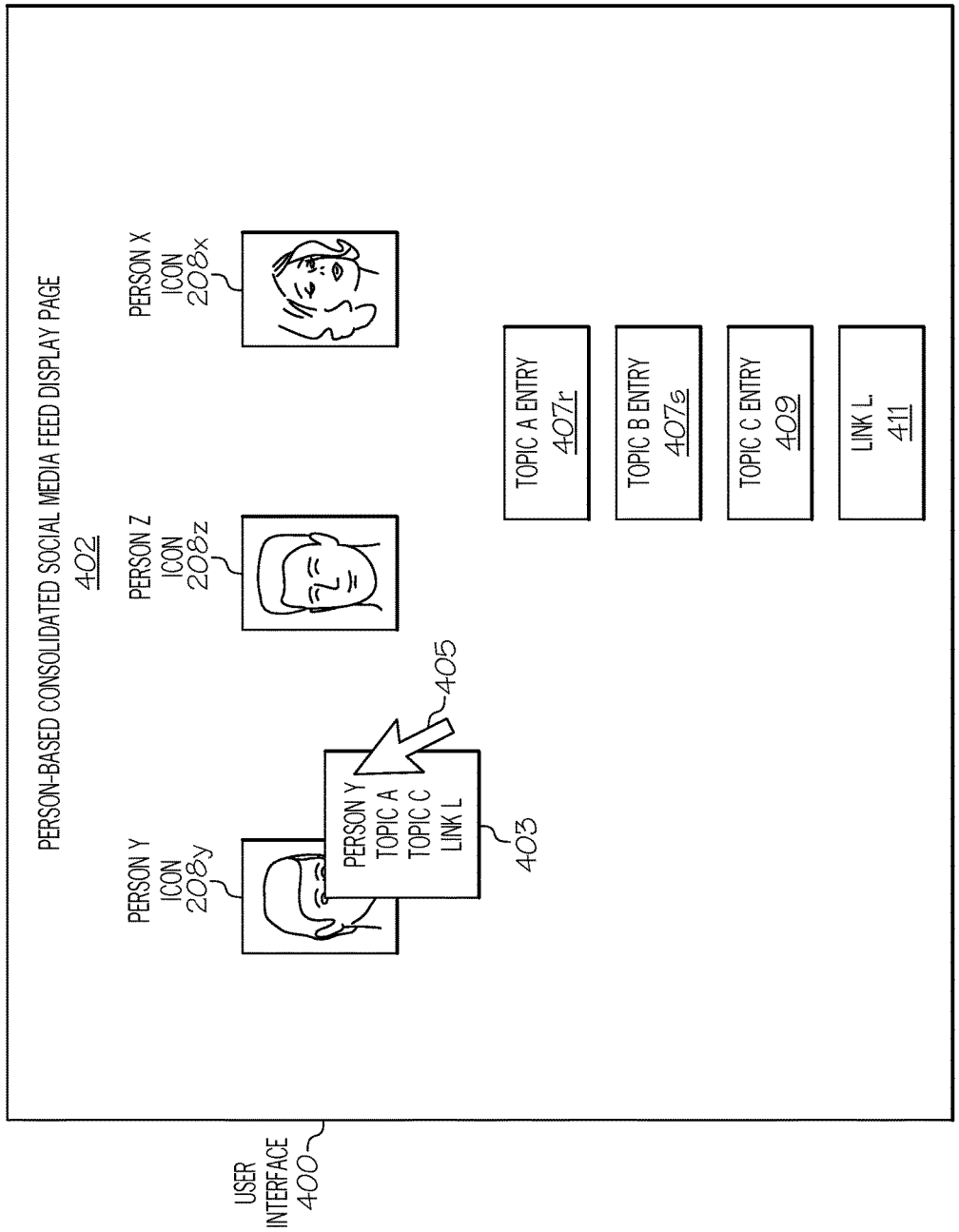
FIG. 4 illustrates an exemplary topic-based consolidated social media feed display page in accordance with one or more embodiments of the present invention.

Person icons 208x-208z represent different persons who post social media postings on a particular social media page that is displayed to a user. Additional details of such a social media page after being configured according to embodiments of the present invention are depicted in FIG. 4.

Assume now that a social media feed initially takes on the form of lists, which are organized just in chronological order and/or under certain headings. However, without the teachings of the present invention, these lists are presented in their entirety to the user, making it difficult for the user to consume (read, navigate, etc.). The present invention overcomes this problem by allowing the user and/or system to select only certain postings from the social media feed for display.

Figure 3:
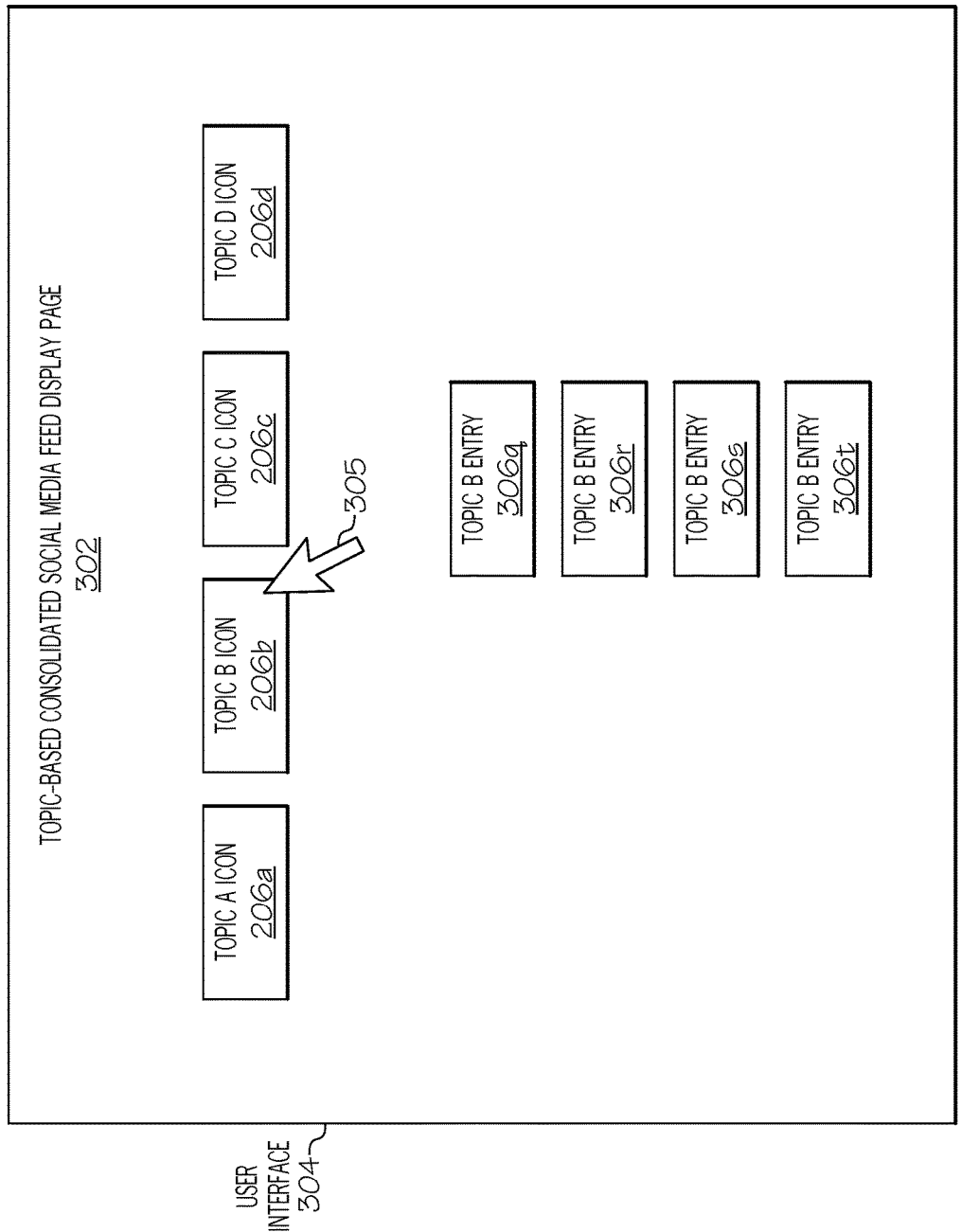
FIG. 3 depicts an exemplary person-based consolidated social media feed display page in accordance with one or more embodiments of the present invention.

For example, consider FIG. 3, in which an exemplary topic-based consolidated social media feed display page 302, being displayed on a user interface 304, has been generated by a user clicking topic icon 206b (i.e., inputting an input from a mouse or other input device while hovering a cursor 305 over topic icon 206b). Assume that an original social media feed (not shown) being presented to a social media user interface contained entries related to Topics A-D, which respectively are represented by topic icons 206a-206d. That is, each entry includes metadata identifying the topic to which the entry is pertinent/related.

As shown in FIG. 3, the system has now created topic-based consolidated social media feed display page 302 by clicking the "all topics" button 211 in FIG. 2. Clicking button 211 causes topic-based consolidated social media feed display page 302 to initially be populated with topic icons 206a-206d, as shown in FIG. 3. Alternatively, the user may selectively choose one or more of the topic icons 206a-206d to populate the topic-based consolidated social media feed display page 302.

As shown in FIG. 3, by clicking topic icon 206b, only pertinent/related entries 306q-306t, each of which pertains to Topic B, are displayed on the topic-based consolidated social media feed display page 302. Thus, the social media feed has been "cleaned up" to display only entries 306q-306t.

With reference now to FIG. 4, an exemplary person-based consolidated social media feed display page 402, being displayed on a user interface 400, has been generated by the user by clicking the "all persons" button 213 in FIG. 2. Clicking button 213 causes person-based consolidated social media feed display page 402 to initially be populated with person icons 208x-208z, as shown in FIG. 4. Alternatively, the user may selectively choose one or more of the person icons 208x-208z to populate the person-based consolidated social media feed display page 402.

As depicted in FIG. 4, by clicking the cursor 405 being hovered over a pop-up box 403, which is related to person icon 208y for Person Y, only content related to Person Y will be displayed on the person-based consolidated social media feed display page 402. That is, assume again that each entry in the original social media feed (not shown) being presented to the social media user interface includes metadata that identifies the author of the entry. By hovering the cursor 405 over person icon 208y, the pop-up box 403 presents multiple content options to the user.

For example, the user may elect to display all content associated with (i.e., authored by and/or being related to) Person Y simply by clicking on "Person Y" in the pop-up box 403. As depicted in FIG. 4, this causes all content attributed to and/or related to Person Y (i.e., entries 407r-407s related to Topic A, entry 409 related to Topic C, and link 411 related to Link L) to be displayed on exemplary person-based consolidated social media feed display page 402. Alternatively, the user may have selected only one or more of the options shown in pop-up box 403, thus causing only specific content/links to be displayed on exemplary person-based consolidated social media feed display page 402.

Entries 407r-407s and/or entry 409 may be text entries, photograph and/or video postings, etc. that are related to Person Y (e.g., were authored by Person Y, were authored by another person and describe Person Y, were authored by another person and were responded to by Person Y, etc.), and are directly accessible from exemplary person-based consolidated social media feed display page 402 (e.g., are displayed on person-based consolidated social media feed display page 402. Link 411 is a hyperlink to another resource, such as another webpage, which will provide additional information related to Person Y, since metadata found in the webpage or other resource to which this hyperlink points contains metadata identifying Person Y. Thus, as in FIG. 3, the original social media feed has been filtered to display only entries/links of interest to the user.

Returning again to FIG. 2, an order in which topic icons 206a-206d and/or person icons 208x-208z are displayed on the topic-based consolidated social media feed display page 302 in FIG. 3 and/or the person-based consolidated social media feed display page 402 in FIG. 4 can be customized by the user and/or the system (e.g., by executing portions of the SMSSDL 148 shown in FIG. 1). For example, assume that the user wishes to display person icons 208x-208z in a certain order (e.g. from left to right) on the person-based consolidated social media feed display page 402 shown in FIG. 4. In this example, the user and/or system elects to display person icon 208y at the far left, with person icon 208z next, and person icon 208x at the far right, as shown in FIG. 4. This ordering of the person icons 208x-208z may be caused by various actions by the user and/or the system.

For example, the user may wish to order the person icons 208x-208z according to how frequently the person (represented by one of the person icons 208x-208z) commented on or otherwise posted an entry on the user's social media webpage. By clicking the publication field 210a in FIG. 2, the order in which the person icons 208z-208z are displayed on the person-based consolidated social media feed display page 402 in FIG. 4 will be adjusted accordingly.

In one embodiment of the present invention, the user may wish to order the person icons 208x-208z according to how recently the person (represented by one of the person icons 208x-208z) commented on or otherwise posted an entry on the user's social media webpage. By clicking the time field 210b in FIG. 2, the order in which the person icons 208z-208z are displayed on the person-based consolidated social media feed display page 402 in FIG. 4 will be adjusted accordingly.

In one embodiment of the present invention, the user may wish to order the person icons 208x-208z according to how closely the person (represented by one of the person icons 208x-208z) "follows" the user on a social networking service by re-posting content from the user. That is, certain social networking services allow a first user to broadcast content (typically in the form of short message service (SMS) messages that are limited to a certain number of characters). These social networking services track how popular the postings of the user are by 1) how often message recipients "open" the SMS messages and/or 2) how often the message recipients forward the message, with or without embellishing content, to other devices/persons. Thus, the "owner" of the person-based consolidated social media feed display page 402 may desire that the most "faithful" followers have their person icon displayed first (to the far left, such as person icon 208y in FIG. 4). By clicking the social group 210c in FIG. 2, the order in which the person icons 208z-208z are displayed on the person-based consolidated social media feed display page 402 in FIG. 4 will be adjusted accordingly.

In one embodiment of the present invention, the user may wish to order the person icons 208x-208z according to how closely the communication patterns of the person represented by one of the person icons 208x-208z and the communication patterns of the "owner" of the person-based consolidated social media feed display page 402 align. For example, data mining of electronic communications (e.g., e-mail, webpage postings, website log (blog) postings, browser searches, etc.) may reveal that the "owner" of the person-based consolidated social media feed display page 402 may share more interests with Person Y than Person Z, who has more common interests with the "owner" of the person-based consolidated social media feed display page 402 than Person X. By clicking communication pattern field 210d in FIG. 2, the order in which the person icons 208z-208z are displayed on the person-based consolidated social media feed display page 402 in FIG. 4 will be adjusted accordingly.

Figure 5:
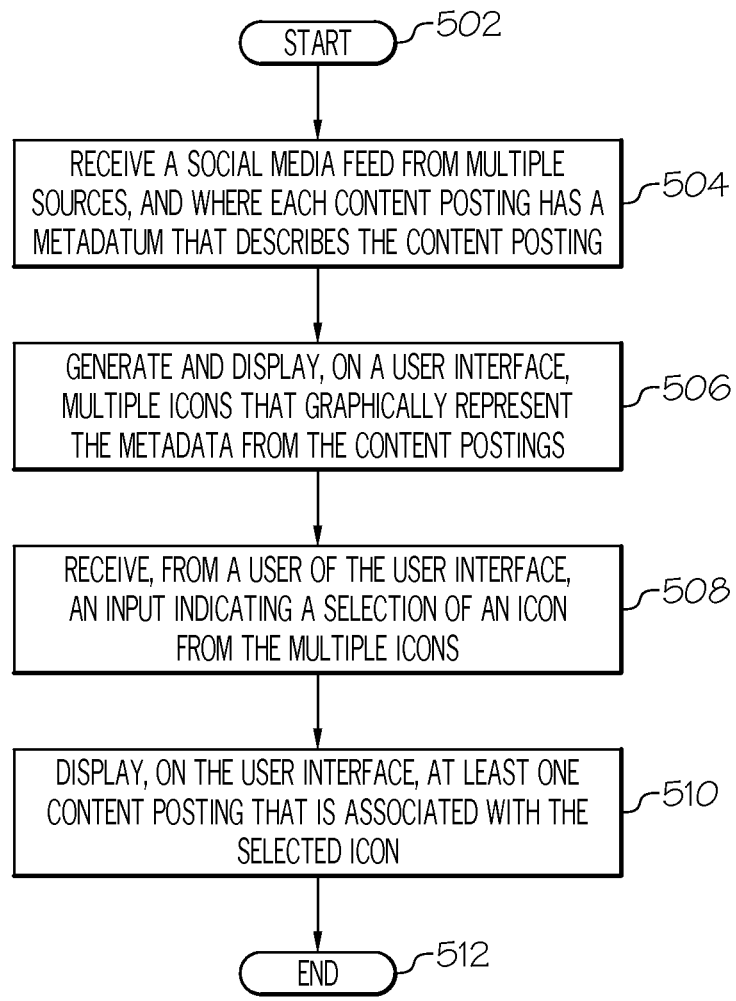
FIG. 5 is a high-level flow chart of one or more steps performed by electronic device(s) to organize and display social media feeds.

With reference now to FIG. 5, a high-level flow chart of one or more steps performed by one or more electronic device(s) to organize and display social media feeds is presented.

After initiator block 502, one or more processors (e.g., processor 104 shown in computer 102 in FIG. 1) receive a social media feed, as described in block 504. The social media feed, which may be supplied by a social media service server 158 depicted in FIG. 1, includes content postings from multiple sources, and each content posting has a metadatum (or plural metadata) that describes the content posting. For example and as described herein, a metadatum/metadata may identify who authored or otherwise made the content posting available, or a metadatum/metadata may identify the topic/subject of the content posting.

As described in block 506, one or more processors generate and display, on a user interface (e.g., consolidated social media feed setup page 202 shown in FIG. 2), multiple icons (e.g., topic icons 206a-206d and/or person icons 208x-208z) that graphically represent the metadata from the content postings. That is, if a particular entry in the social media feed has a metadatum/metadata indicating that Person X authored that particular entry, then person icon 208x for Person X is generated and displayed on user interface 204, as shown in FIG. 2.

As described in block 508 in FIG. 5, one or more processors receive, from a user of the user interface, an input indicating a selection of an icon from the multiple icons, as discussed in FIG. 3 and FIG. 4 above.

As described in block 510 in FIG. 5, one or more processors display, on the user interface, at least one content posting that is associated with the selected icon as discussed in FIG. 3 and FIG. 4 above.

The flow-chart depicted in FIG. 5 ends at terminator block 512.

In an embodiment of the present invention, one or more processors arrange an order in which the multiple icons are displayed according to dates on which the content postings were posted on the social media feed. For example, assume that the newest entries in a social media feed are related to Topic A. Assume further that the next most recent entries were related to Topic B, followed by entries related to Topic C, and finally entries related to Topic D. In this example, the topic icons 206a-206d would be displayed as shown in FIG. 3.

In an embodiment of the present invention, one or more processors determine a relationship between the user of the user interface and authors of the content postings, as discussed with regard to elements 210a-210d in FIG. 2. Thereafter, one or more processors arrange an order in which the multiple icons are displayed according to the relationship between the user of the user interface and the authors of the content postings, as discussed in FIG. 3 and/or FIG. 4.

That is, in one embodiment of the present invention, the user of the user interface also authors social media postings on the social media feed from the social media service. Thus, one or more processors identify which other authors of the content postings follow the social media postings of the user of the user interface. That is, the processors identify which other authors of content on the social media feed have commented on or otherwise responded to content posted on the social media feed by the owner of the user interface that hosts the social media feed. Thereafter, one or more processors determine the relationship between the user of the user interface and the other authors of the content postings according to a level of response that the other authors of the content postings initiate in response to the content postings of the user (i.e., how often the other authors post replies to the postings of the owner/user of the user interface on which the social media feed is displayed).

In another embodiment of the present invention, the social media service is a first social media service (e.g., a website devoted to sharing content postings), and the user of the user interface authors content postings on a second social media service (e.g., an SMS publication/subscription service) that is different from the first social media service. That is, not only does the user host the social media feed on his/her social media webpage, but he/she also publishes SMS messages to subscribers known as "followers" of his/her SMS messages. In this embodiment, one or more processors identify which authors of the content postings from the first social media service subscribe to the content postings of the user of the user interface on the second social media service. That is, the processors identify which parties not only are posting on the social media website hosted by the user, but also which parties are "followers" of the user on an SMS publication/subscription service. The processors are thus able to determine the relationship between the user of the user interface and authors of the content postings from the first social media service according to a level of response that the authors of the content postings initiate to the content postings by the user on the second social media service. That is, if a party opens and/or re-transmits SMS messages posted by the user who also hosts the social media website, then an assumption is made that there is a strong bond between that party and the user who also hosts the social media website.

In one embodiment of the present invention, the social media service is a first social media service, and the social media feed is a first social media feed from the first social media service. That is, the first social media feed is found on a social media website hosted by the user, as described above. One or more processors then data mine electronic content posted by the authors of the content postings using a second social media service (e.g., an SMS publication/subscription service) that is different from the first social media service (e.g., a social media website hosting service). Similarly, the processors data mine electronic content posted by the user of the user interface (who "owns" the social media website) using the second social media service. The processors match interests of the authors of the content postings from the first social media feed to interests of the user of the user interface based on said data mining of content posted by the second social media service. That is, if both the owner of the social media feed website and others who post entries on that social media feed website are also posting SMS messages that are related to a same topic, then an assumption is made that there is a close (topic-based) relationship between the owner of the social media feed website and others who post entries on that social media feed website. Based on this matching, the processors are able to determine the (closeness of the) relationship between the user of the user interface and authors of the content postings from the first social media feed based on the matching interests.

In one embodiment of the present invention, one or more processors retrieve (e.g., from a database storage system 152 shown in FIG. 1) a profile of the user of the user interface. The profile describes ranked interests of the user of the user interface. For example, the profile may indicate that the person to whom a particular social media website is devoted to may be most interested in history, followed by literature, followed by movies, followed by gardening (the topic that this person has the least amount of interest in). The processors thus match the ranked interests to the metadata describing the content postings, and then arrange the multiple icons according to the ranked interests of the user of the user interface. For example, assume that Topic A discussed in FIG. 2 is history, Topic B is literature, Topic C is movies, and Topic D is gardening. In this example, the order of the topic icons 206a-206d would be that shown in FIG. 3 (from left to right in decreasing order of interest for that person).

In one embodiment of the present invention, the multiple icons are author icons that graphically represent authors of the content postings (see person icons 208x-208z in FIG. 2). In this embodiment, the method further comprises one or more processors retrieving a profile of the user of the user interface (e.g., from database storage system 152 shown in FIG. 1), where the profile describes how many times the user of the user interface has responded to authors of the content postings. For example, assume that a social media website shows postings from multiple sources/authors. Assume further that the owner of that social media website responds to some of the postings more often than other postings, particularly based on who submitted the postings and/or the content of the postings. The processors thus arrange the author icons according to how many times the user of the user interface has responded to authors of the content postings.

In one embodiment of the present invention, the user of the user interface is an author of at least one of the content postings from the social media feed. One or more processors determine a relationship between the user of the user interface and other authors of the content postings according to a frequency in which the other authors input an approval/disapproval feedback to content postings by the user of the user interface. That is, the processors identify the frequency or percentage of entries by a particular party indicating that they "like" (approve of) or "don't like" (disapprove of) entries that the owner of the social media website has posted. Based on these "likes" or "don't likes", an order in which the multiple icons are displayed according to this relationship between the user of the user interface and the other authors of the content postings.

In one embodiment of the present invention, parties posting content onto the social media feed (on the social media website owned by a particular user) are voluntarily monitored by biometric sensors, such as the biometric sensor 160, working alone or in conjunction with camera 156, as described above with regards to FIG. 1. That is, assume that biometric sensor 160 is part of the electronic communication device 154 shown in FIG. 1, and that electronic communication device 154 (e.g., a smart phone, tablet computer, etc.) is able to take biometric readings (using biometric sensor 160 either alone, or in conjunction with camera 156) of a user/party who is posting to the social media feed on the social media website. Based on these biometric readings, one or more processors are able to arrange an order in which the multiple icons are displayed according to the biometric readings. For example, if the biometric readings indicate that the poster is in a highly agitated state, then the person icon (e.g., person icon 208*y* shown in FIG. 4) may be presented in a most prominent position (e.g., to the far left).

In one or more embodiments, the present invention processes a social news stream by analyzing updates received from the present moment, and going back through x duration of time (i.e. such as a "day", "week" or "the last time the user viewed"). The metadata of each stream entry is analyzed for common relationships to other stream entries, such as "person (actor)", filename (content title), etc. When high level subject objects, such as a person or topic/file, are identified to have an entry in the current stream, they are represented by an image/icon, such as a photo of the person or title page of the file, in a summary view of the stream (see FIG. 3 and/or FIG. 4). Additional news updates pertaining to the subject represented by the icon are aggregated and shown in a list that is accessed via a hover and/or click on the representative image. The representative icons may be arranged together in a summary row, thus consolidating the key content items in one place, without additional metadata. In this way, a user can quickly scan the images to see a person or object of interest which they recognize, and then choose to view the individual news updates related to that person or object.

As described herein, the summary list of items shown on hover may be links that can be clicked in order to navigate to the particular item or attribute, or to expand the list. The items in the list can be links to other content items (such as files that the person edited), or to metadata such as a list of people who liked a particular file.

The order of the icons may be based on importance or relevance to the user who owns a particular social media webpage. For example, content that this user authors, people in his/her "network", or people that he/she "follow" or that "follow" this user, may be prioritized over other content items, thus generating a selectively structured stream of news events. The order of the icons displayed can also be adjusted based on further analytics, such as people with whom a user has the highest frequency of collaborative activity, or shared consumption patterns, topic interests, etc.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of structuring and displaying social media feeds from a social media service, the method comprising:

receiving, by one or more processors, a social media feed, wherein the social media feed comprises content postings from multiple sources, and wherein each content posting comprises metadata that is an attribute of one or more content postings;

generating and displaying, by one or more processors and on a user interface, multiple icons that graphically represent the metadata from the content postings, wherein the metadata includes names of authors of the content postings, topics of the content postings, and links to webpages that provide additional information about the authors of the content postings;

receiving, by one or more processors and from a user of the user interface, an input indicating a selection of a particular icon from the multiple icons, wherein the particular icon represents a particular author of content postings;

in response to receiving the input indicating the selection of the particular icon, displaying, by one or more processors, a pop-up box that displays a name of the particular author represented by the particular icon, a list of multiple topics about which the particular author has posted content, and a link to a webpage that provides addition information about the particular author;

receiving, by one or more processors, a user selection of one of the multiple topics about which the particular author has posted content;

in response to receiving the user selection of the one of the multiple topics about which the particular author has posted content, displaying, by one or more processors, content postings about the one of the multiple topics about which the particular author has posted content on the user interface;

receiving, by one or more processors, a user selection of the link to the webpage that provides addition information about the particular author;

in response to receiving the user selection of the link to the webpage that provides addition information about the particular author, displaying, by one or more processors, the webpage that provides the additional information about the particular author on the user interface; and arranging, by one or more processors, an order in which the multiple icons are displayed according to dates on which the content postings were posted on the social media feed.

2. The method of claim 1, further comprising:
receiving, from one or more biometric sensors, biometric readings that describe a physiological state of persons who are posting the content postings; and
further arranging, by one or more processors, the order in which the multiple icons are displayed according to the biometric readings.

3. The method of claim 2, wherein the biometric readings describe a level of agitation of the persons who are posting the content postings, and wherein the method further comprises:
determining, by one or more processors, the level of agitation of the persons who are posting the content postings based on the biometric readings;
identifying, by one or more processors, a particular person who is in a highest agitated state compared to other persons who are posting the content postings; and
displaying on the user interface, a posting of the particular person who is in the highest agitated state in a far left position on the user interface.

4. The method of claim 1, further comprising:
determining, by one or more processors, a relationship between the user of the user interface and the authors of the content postings; and
arranging, by one or more processors, an order in which the multiple icons are displayed according to the relationship between the user of the user interface and the authors of the content postings.

5. The method of claim 4, wherein the user of the user interface also authors social media postings on the social media feed from the social media service, and wherein the method further comprises:
identifying, by one or more processors, which other authors of the content postings follow the social media postings of the user of the user interface; and
determining, by one or more processors, the relationship between the user of the user interface and the other authors of the content postings according to a frequency of responses that the other authors of the content postings initiate in response to the social media postings of the user.

6. The method of claim 4, wherein the social media service is a first social media service, wherein the user of the user interface authors content postings on a second social media service that is different from the first social media service, and wherein the method further comprises:
identifying, by one or more processors, which authors of the content postings from the first social media service subscribe to the content postings of the user of the user interface on the second social media service; and
determining, by one or more processors, the relationship between the user of the user interface and the authors of the content postings from the first social media service according to a level of response that the authors of the content postings initiate to the content postings by the user on the second social media service.

7. The method of claim 4, wherein the social media service is a first social media service, wherein the social media feed is a first social media feed from the first social media service, and wherein the method further comprises:
data mining, by one or more processors, electronic content posted by the authors of the content postings using a second social media service that is different from the first social media service;
data mining, by one or more processors, electronic content posted by the user of the user interface using the second social media service;
matching, by one or more processors, interests of the authors of the content postings from the first social media feed to interests of the user of the user interface based on said data mining of content posted by the second social media service; and
determining, by one or more processors, the relationship between the user of the user interface and the authors of the content postings from the first social media feed based on said matching interests.

8. The method of claim 1, further comprising:
retrieving, by one or more processors, a profile of the user of the user interface, wherein the profile describes ranked interests of the user of the user interface;
matching, by one or more processors, the ranked interests to the metadata describing the content postings; and
arranging, by one or more processors, the multiple icons according to the ranked interests of the user of the user interface.

9. The method of claim 1, wherein the multiple icons are author icons that graphically represent the authors of the content postings, and wherein the method further comprises:
  retrieving, by one or more processors, a profile of the user of the user interface, wherein the profile describes how many times the user of the user interface has responded to the authors of the content postings; and
  arranging, by one or more processors, the author icons according to how many times the user of the user interface has responded to the authors of the content postings.

10. The method of claim 1, wherein the user of the user interface is an author of at least one of the content postings from the social media feed, and wherein the method further comprises:
  determining, by one or more processors, a relationship between the user of the user interface and other authors of the content postings according to a frequency in which the other authors input an approval feedback to content postings by the user of the user interface; and
  arranging, by one or more processors, an order in which the multiple icons are displayed according to the relationship between the user of the user interface and the other authors of the content postings.

11. The method of claim 1, wherein the user of the user interface is an author of at least one of the content postings from the social media feed, and wherein the method further comprises:
  determining, by one or more processors, a relationship between the user of the user interface and other authors of the content postings according to a frequency in which the other authors input disapproval feedback to content postings by the user of the user interface; and
  arranging, by one or more processors, an order in which the multiple icons are displayed according to the relationship between the user of the user interface and the other authors of the content postings.

12. A computer program product for structuring and displaying social media feeds from a social media service, the computer program product comprising a computer readable storage medium having program code embodied therewith, wherein the computer readable storage medium is not a transitory signal per se, and wherein the program code is readable and executable by a processor to perform a method comprising:
  receiving a social media feed, wherein the social media feed comprises content postings from multiple sources, and wherein each content posting comprises metadata that is an attribute of one or more content postings;
  generating and displaying, on a user interface, multiple icons that graphically represent the metadata from the content postings, wherein the multiple icons are author icons that graphically represent authors of the content postings, wherein the metadata includes names of authors of the content postings, topics of the content postings, and links to webpages that provide additional information about the authors of the content postings;
  receiving, from a user of the user interface, an input indicating a selection of a particular icon from the multiple icons, wherein the particular icon represents a particular author of content postings;
  in response to receiving the input indicating the selection of the particular icon, displaying a pop-up box that displays a name of the particular author represented by the particular icon, a list of multiple topics about which the particular author has posted content, and a link to a webpage that provides addition information about the particular author;
  in response to receiving the user selection from the pop-up box of the name of the particular author from the pop-up box, displaying all content postings by the particular author on the user interface;
  in response to receiving the user selection of the link to the webpage that provides addition information about the particular author, displaying the webpage that provides the additional information about the particular author on the user interface; and
  arranging the author icons according to how many times the user of the user interface has responded to authors of the content postings.

13. A computer system comprising:
  a central processing unit (CPU), a computer readable memory, and a non-transitory computer readable storage media;
  first program instructions to receive a social media feed, wherein the social media feed comprises content postings from multiple sources, and wherein each content posting comprises metadata that is an attribute of one or more content postings;
  second program instructions to generate and display, on a user interface, multiple icons that graphically represent the metadata from the content postings, wherein the multiple icons are author icons that graphically represent authors of the content postings, wherein the metadata includes names of authors of the content postings, topics of the content postings, and links to webpages that provide additional information about the authors of the content postings;
  third program instructions to receive, from a user of the user interface, an input indicating a selection of a particular icon from the multiple icons, wherein the particular icon represents a particular author of content postings;
  fourth program instructions to, in response to receiving the input indicating the selection of the particular icon, display a pop-up box that displays a name of the particular author represented by the particular icon, a list of multiple topics about which the particular author has posted content, and a link to a webpage that provides addition information about the particular author;
  fifth program instructions to, in response to receiving the user selection of one of the multiple topics about which the particular author has posted content, displaying content postings about the one of the multiple topics about which the particular author has posted content on the user interface;
  sixth program instructions to, in response to receiving the user selection of the link to the webpage that provides addition information about the particular author, display the webpage that provides the additional information about the particular author on the user interface; and
  seventh program instructions to arrange the author icons according to how many times the user of the user interface has responded to authors of the content postings; and wherein
the first, second, third, fourth, fifth, sixth, and seventh, and eighth program instructions are stored on the non-transitory computer readable storage media for execution by the CPU via the computer readable memory.

14. The computer system of claim 13, further comprising:
eighth program instructions to arrange an order in which the multiple icons are displayed according to dates on which the content postings were posted on the social media feed; and wherein
the eighth program instructions are stored on the non-transitory computer readable storage media for execution by the CPU via the computer readable memory.

\* \* \* \* \*